United States Patent
Hasegawa et al.

(10) Patent No.: US 10,714,769 B2
(45) Date of Patent: Jul. 14, 2020

(54) FUEL CELL SYSTEM WITH CATHODE PURGING

(71) Applicant: TOYOTA JIDOSHA KABUSHIKI KAISHA, Toyota-shi, Aichi-ken (JP)

(72) Inventors: Shigeki Hasegawa, Toyota (JP); Masashi Toida, Nagoya (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 434 days.

(21) Appl. No.: 15/608,960

(22) Filed: May 30, 2017

(65) Prior Publication Data
US 2018/0026280 A1 Jan. 25, 2018

(30) Foreign Application Priority Data
Jul. 21, 2016 (JP) .................... 2016-142894

(51) Int. Cl.
*H01M 8/04119* (2016.01)
*H01M 8/04228* (2016.01)
(Continued)

(52) U.S. Cl.
CPC ... *H01M 8/04179* (2013.01); *H01M 8/04097* (2013.01); *H01M 8/04111* (2013.01);
(Continued)

(58) Field of Classification Search
CPC ......... H08M 8/04231; H08M 8/04164; H08M 8/04097; H08M 8/04197; H08M 8/04223;
(Continued)

(56) References Cited

U.S. PATENT DOCUMENTS

2004/0053092 A1  3/2004  Kato et al.
2007/0054165 A1*  3/2007  Yoshida ............... B60K 6/46
                                                    429/415
(Continued)

FOREIGN PATENT DOCUMENTS

CN  101640279 A  2/2010
CN  105609839 A  5/2016
(Continued)

*Primary Examiner* — Jesse Y Miyoshi
(74) *Attorney, Agent, or Firm* — Dickinson Wright PLLC

(57) ABSTRACT

A fuel cell system, comprising: a fuel cell stack including a stacked body provided by stacking a plurality of cells in a stacking direction; a compressor configured to feed a purge gas to a cathode of the fuel cell stack; a controller configured to control the compressor, such as to perform stop-time purging that purges the cathode of the fuel cell stack when operation of the fuel cell system is stopped; a first temperature gauge configured to measure a first temperature value that reflects temperature of a cell placed near a center in the stacking direction among the plurality of cells constituting the stacked body and to input the measured first temperature value into the controller; and a second temperature gauge configured to measure a second temperature value that reflects temperature of a cell placed near an end in the stacking direction among the plurality of cells constituting the stacked body and to input the measured second temperature value into the controller, wherein the controller is configured to suspend the stop-time purging when the first temperature value is equal to or higher than a first reference temperature and the second temperature value is lower than a second reference temperature.

10 Claims, 11 Drawing Sheets

(51) Int. Cl.
  *H01M 8/04089* (2016.01)
  *H01M 8/04223* (2016.01)
  *H01M 8/04537* (2016.01)
  *H01M 8/0432* (2016.01)
  *H01M 8/04111* (2016.01)
  *H01M 8/04082* (2016.01)
  *H01M 8/04828* (2016.01)
  *H01M 8/1018* (2016.01)
  *H01M 8/241* (2016.01)

(52) U.S. Cl.
  CPC ... *H01M 8/04164* (2013.01); *H01M 8/04197* (2016.02); *H01M 8/04223* (2013.01); *H01M 8/04228* (2016.02); *H01M 8/04231* (2013.01); *H01M 8/04358* (2013.01); *H01M 8/04365* (2013.01); *H01M 8/04373* (2013.01); *H01M 8/04544* (2013.01); *H01M 8/04552* (2013.01); *H01M 8/04634* (2013.01); *H01M 8/04649* (2013.01); *H01M 8/04828* (2013.01); *H01M 8/1018* (2013.01); *H01M 8/241* (2013.01); *H01M 2008/1095* (2013.01); *H01M 2250/20* (2013.01); *H01M 2250/30* (2013.01); *Y02T 90/32* (2013.01)

(58) Field of Classification Search
  CPC ......... H08M 8/04228; H08M 8/04649; H08M 8/04111
  See application file for complete search history.

(56) References Cited

U.S. PATENT DOCUMENTS

| | | | |
|---|---|---|---|
| 2008/0057372 A1* | 3/2008 | Sommer | H01M 8/04 429/434 |
| 2009/0023020 A1* | 1/2009 | Hamada | H01M 8/04097 429/432 |
| 2010/0015482 A1* | 1/2010 | Kajiwara | H01M 8/04097 429/515 |
| 2010/0028728 A1 | 2/2010 | Clingerman et al. | |
| 2010/0047644 A1 | 2/2010 | Imamura | |
| 2010/0068578 A1 | 3/2010 | Katano | |
| 2011/0217611 A1 | 9/2011 | Okuyoshi et al. | |
| 2013/0034787 A1 | 2/2013 | Miyata et al. | |
| 2013/0189595 A1 | 7/2013 | Izuhara et al. | |
| 2016/0141671 A1 | 5/2016 | Ogawa et al. | |

FOREIGN PATENT DOCUMENTS

| | | |
|---|---|---|
| JP | 2004111200 A | 4/2004 |
| JP | 2008-021448 A | 1/2008 |
| JP | 2008-103257 A | 5/2008 |
| JP | 2008166126 A | 7/2008 |
| JP | 2008-282675 A | 11/2008 |
| JP | 2009-218113 A | 9/2009 |
| JP | 2013037790 A | 2/2013 |
| JP | 2013-134832 A | 7/2013 |
| JP | 2013152823 A | 8/2013 |
| JP | 2016-095997 A | 5/2016 |
| WO | 2010/073386 A1 | 7/2010 |

* cited by examiner

FUEL CELL SYSTEM WITH CATHODE PURGING

BACKGROUND

Field

The present disclosure relates to purging of a fuel cell.

Related Art

JP 2013-134832A discloses a technique of purging cathodes in a fuel cell after operation of the fuel cell is stopped.

Purging the cathodes is generally performed for the purpose of reducing the amount of water present in a cathode flow path of each of cells constituting the fuel cell (hereinafter also called cathode water). It is desired to provide a higher flow rate of a purge gas for a cell that has a larger amount of the cathode water.

In the actual state, however, the cell having a larger amount of the cathode water has a higher flow resistance of the purge gas. This results in providing only a low flow rate of the purge gas. When there is a significant difference in the amount of the cathode water among a plurality of cells constituting a fuel cell stack, the purging does not effectively reduce the amount of the cathode water from a cell having a large amount of the cathode water and additionally accelerates drying of a cell having a small amount of the cathode water. Every time purging of the cathodes is performed, the purge gas is less likely to flow in the cell having a large amount of the cathode water. This further increases the difference in the flow resistance between the cell having a large amount of the cathode water and the cell that tends to be dried. This accordingly increases the degree of drying in the cell that tends to be dried and causes the cell to be excessively dried. This is likely to cause degradation of the cell. It is desired to avoid this problem. By taking into account the foregoing, an object of the present disclosure is to appropriately suspend purging of the cathodes.

SUMMARY

According to one aspect of the disclosure, there is provided a fuel cell system. This fuel cell system comprises a fuel cell stack including a stacked body provided by stacking a plurality of cells in a stacking direction; a compressor configured to feed a purge gas to a cathode of the fuel cell stack; a controller configured to control the compressor, such as to perform stop-time purging that purges the cathode of the fuel cell stack when operation of the fuel cell system is stopped; a first temperature gauge configured to measure a first temperature value that reflects temperature of a cell placed near a center in the stacking direction among the plurality of cells constituting the stacked body and to input the measured first temperature value into the controller; and a second temperature gauge configured to measure a second temperature value that reflects temperature of a cell placed near an end in the stacking direction among the plurality of cells constituting the stacked body and to input the measured second temperature value into the controller. The controller is configured to suspend the stop-time purging when the first temperature value is equal to or higher than a first reference temperature and the second temperature value is lower than a second reference temperature.

DESCRIPTION OF EMBODIMENTS

Figure 1:
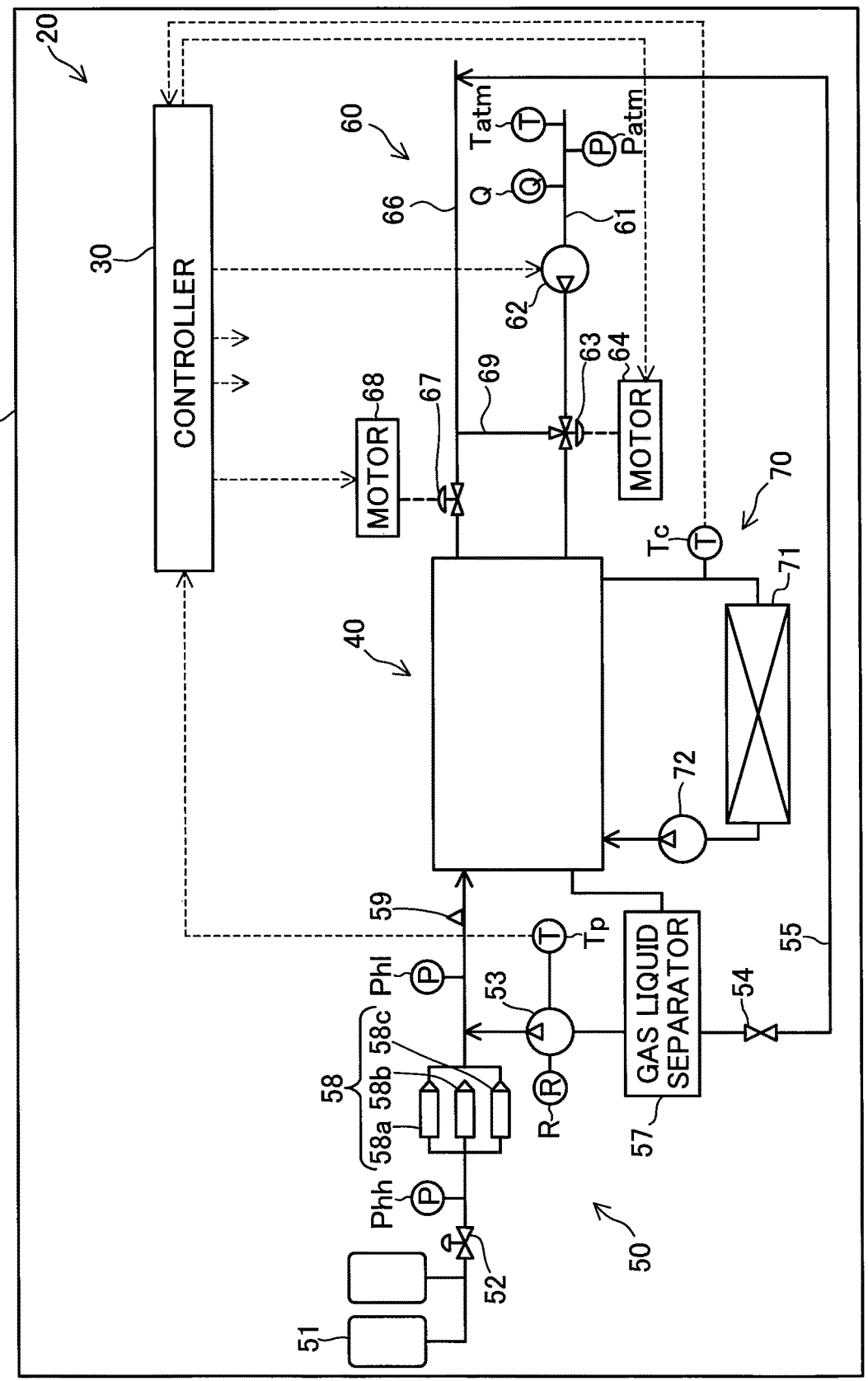
FIG. 1 is a block diagram illustrating the schematic configuration of a fuel cell system.

FIG. 1 is a block diagram illustrating the schematic configuration of a fuel cell system 20. The fuel cell system 20 is mounted on a motor vehicle 1. The fuel cell system 20 employs a polymer electrolyte fuel cell to generate electric power by a reaction of an anode gas with a cathode gas. The anode gas is hydrogen. The cathode gas is oxygen included in the air. As shown in FIG. 1, the fuel cell system 20 includes a fuel cell stack 40, a hydrogen supply discharge mechanism 50, an air supply discharge mechanism 60, a cooling water circulation mechanism 70 and a controller 30.

The hydrogen supply discharge mechanism 50 is configured to supply and discharge hydrogen to and from anodes of the fuel cell stack 40 and includes a hydrogen tank 51, a regulator 52, a hydrogen pump 53, a drainage shutoff valve 54, a discharge pathway 55, a gas liquid separator 57, three injectors 58a, 58b and 58c, a low pressure relief valve 59, a high pressure-side pressure gauge Phh, a low pressure-side pressure gauge Phl, a temperature gauge Tp and a resolver R. In the description below, the three injectors 58a, 58b and 58c are collectively referred to as injector 58.

The hydrogen tank 51 is provided to store hydrogen. The regulator 52 is configured to regulate the pressure of the hydrogen stored in the hydrogen tank 51 and supply the hydrogen of the regulated pressure to the injector 58. The injector 58 is configured to inject the supplied hydrogen toward the anodes under control of the controller 30. The supply amount of hydrogen to the fuel cell stack 40 is adjusted by injection control of the injector 58 and open-close control of the drainage shutoff valve 54.

The gas liquid separator 57 is configured to separate a gas and a liquid that are discharged from the anodes, from each other. The hydrogen pump 53 is configured to resupply the gas separated by the gas liquid separator 57 to the fuel cell stack 40. The gas separated by the gas liquid separator 57 mainly includes hydrogen that is discharged without being consumed, nitrogen that is transmitted from a cathode through an MEA, and moisture (water vapor) that is not separated by the gas liquid separator 57.

The discharge pathway 55 is a pathway arranged to connect the gas liquid separator 57 with an air discharge flow path 66 (described later) provided in the air supply discharge mechanism 60. The drainage shutoff valve 54 is provided in the discharge pathway 55. The drainage shutoff valve 54 is opened to discharge the liquid and nitrogen separated by the gas liquid separator 57.

The high pressure-side pressure gauge Phh is configured to measure the pressure of hydrogen between the regulator 52 and the injector 58. The low pressure-side pressure gauge Phl is configured to measure the pressure of hydrogen prior to the inflow into the fuel cell stack 40 (hereinafter referred to as supply pressure). The temperature gauge Tp is configured to measure the temperature of the hydrogen pump 53. More specifically, the temperature gauge Tp is configured to measure the temperature of a motor core (described later) built in the hydrogen pump 53. In the description below, the measurement value of the temperature gauge Tp is called hydrogen pump temperature. The resolver R is configured to measure the rotation speed of the hydrogen pump 53. More specifically, the resolver R is configured to measure the rotation speed of a motor in the hydrogen pump 53. The low pressure relief valve 59 is opened to release hydrogen to the atmosphere when a difference between the supply pressure and the atmospheric pressure reaches a threshold value.

The air supply discharge mechanism 60 is configured to supply and discharge the air to and from the cathodes of the fuel cell stack 40 and includes an air supply flow path 61, a compressor 62, a flow dividing valve 63, a motor for flow dividing valve 64, an air discharge flow path 66, a pressure regulator 67, a motor for pressure regulator 68, a bypass pathway 69, an atmospheric pressure gauge Patm, an ambient temperature gauge Tatm and a flowmeter Q.

The air supply flow path 61 and the air discharge flow path 66 are flow passages respectively arranged to connect the fuel cell stack 40 with their respective open air ports. The compressor 62 is provided in the middle of the air supply flow path 61 and is configured to take in the air from the open air port of the air supply flow path 61 and compress the intake air. The compressor 62 is placed at a location that is nearer to the open air port than the position of connection of the air supply flow path 61 and the bypass pathway 69.

The flow dividing valve 63 is provided on the downstream side of the compressor 62 in the air supply flow path 61 or more specifically between the compressor 62 and the fuel cell stack 40. The flow dividing valve 63 is configured to divide the flow of the air flowing from the compressor 62 into the downstream side of the air supply flow path 61 and the bypass pathway 69. This type of valve is also called three-way valve. The state that the air flowing from the compressor 62 is fully flowed to the downstream side of the air supply flow path 61 denotes the state that "the flow dividing valve 63 is fully opened".

The motor for flow dividing valve 64 is connected with the flow dividing valve 63 and is configured to generate a torque that is used to regulate the opening position of the flow dividing valve 63. The bypass pathway 69 is a flow passage arranged to connect the flow dividing valve 63 with the air discharge flow path 66. The pressure regulator 67 is provided in the air discharge flow path 66. The pressure regulator 67 is configured to regulate the flow passage area of the air discharge flow path 66 according to the opening position. The position of connection of the bypass pathway 68 with the air discharge flow path 66 is located on the downstream side of the pressure regulator 67 in the air discharge flow path 66. The motor for pressure regulator 68 is connected with the pressure regulator 67 and is configured to generate a torque that is used to regulate the opening position of the pressure regulator 67.

The air passing through the pressure regulator 67 subsequently passes through the position of connection of the air discharge flow path 66 with the bypass pathway 69 and is discharged through the open air port to the atmosphere.

The flowmeter Q is configured to measure the flow rate of the air taken in by the compressor 62 (hereinafter referred to as intake air). The ambient temperature gauge Tatm is configured to measure the temperature of the intake air. The atmospheric pressure gauge Patm is configured to measure the pressure of the intake air.

The cooling water circulation mechanism 70 is configured to cool down the fuel cell stack 40 and includes a radiator 71, a cooling water pump 72 and a water temperature gauge Tc. The cooling water pump 72 is configured to circulate the cooling water between the fuel cell stack 40 and the radiator 71, in order to control the operation temperature of the fuel cell stack 40. The circulation of cooling water provides heat absorption in the fuel cell stack 40 and heat release in the radiator 71. The water temperature gauge Tc is configured to measure the discharge temperature of the cooling water. The discharge temperature herein denotes a temperature of the cooling water discharged from the fuel cell stack 40 prior to the inflow into the radiator 71. In the description below, the measurement result of the water temperature gauge Tc is called FC water temperature.

The controller 30 is specifically implemented by an ECU (electronic control unit). The controller 30 is configured to output signals that are used to control the operations of the fuel cell system 20. For example, the controller 30 outputs signals to the compressor 62, the motor for flow dividing valve 64 and the motor for pressure regulator 68, in order to perform stop-time purging of the cathodes (described later). The controller 30 uses the measurement values of the water temperature gauge Tc and the temperature gauge Tp for stop-time purging.

Figure 2:
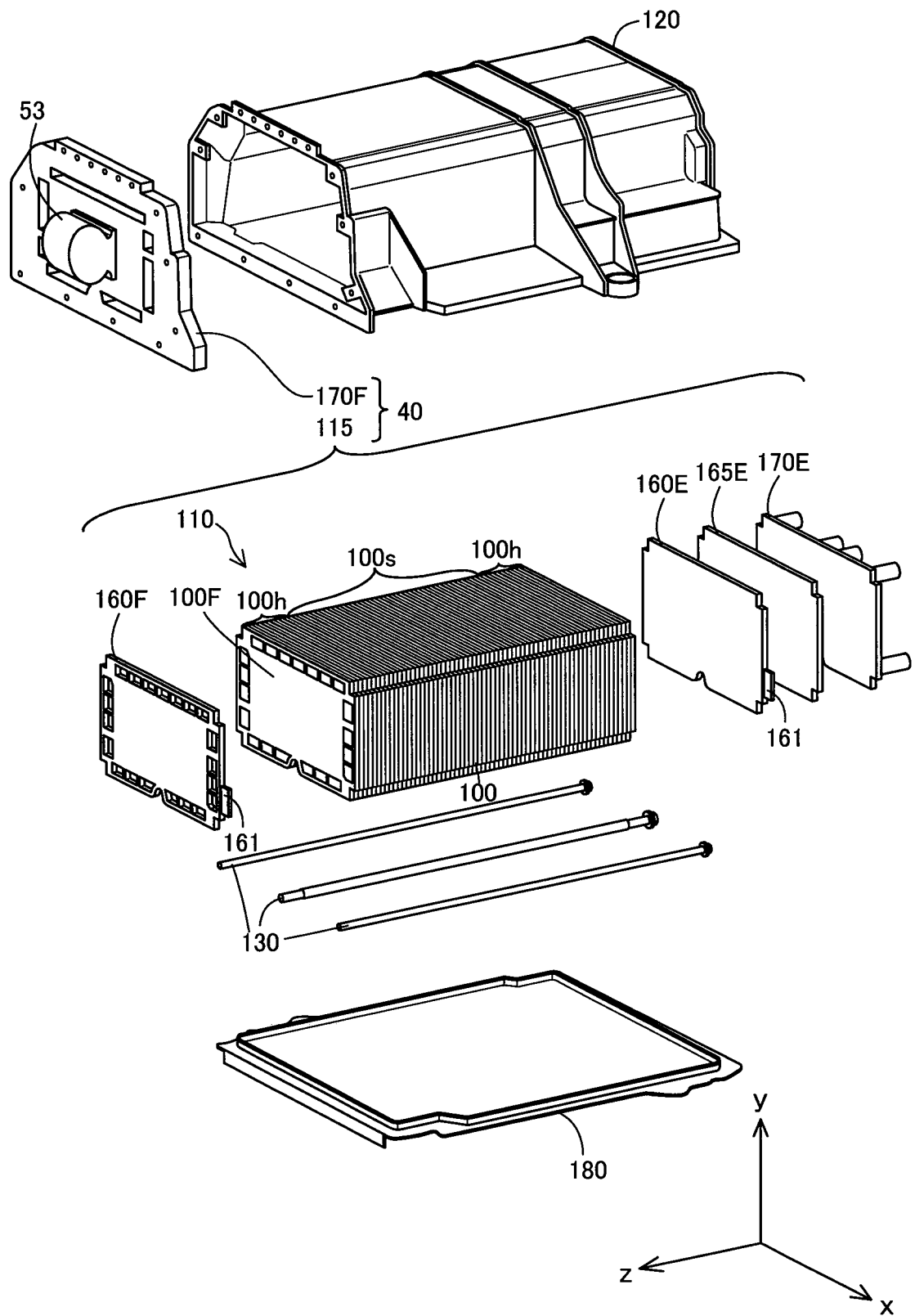
FIG. 2 is an exploded perspective view illustrating a fuel cell stack and components fixed to the fuel cell stack.

FIG. 2 is an exploded perspective view illustrating the fuel cell stack 40 and components fixed to the fuel cell stack 40 (hereinafter referred to as fixed components). All the fixed components are components included in the fuel cell system 20. The fixed components shown in the drawing include the hydrogen pump 53, a case 120, three tension shafts 130 and a cover 180. In the description below, a +z-axis side in FIG. 2 is expressed as front side, a −z-axis side is expressed as rear side, and a −y-axis side is expressed as lower side. A z-axis direction is also called stacking direction.

The fuel cell stack 40 has a layered structure in which a current collector 160F and a front end-side end plate 170F are stacked in this sequence on the front side of a stacked body 110, and a current collector 160E, an insulator plate 165E and a rear end-side end plate 170E are stacked in this sequence on the rear side of the stacked body 110. The stacked body 110 is configured by stacking a plurality of cells 100 (for example, 370 cells) in the stacking direction.

In the description below, the stacked part of the current collector 160F, the stacked body 110, the current collector 160E, the insulator plate 165E and the rear end-side end plate 170E is also called fuel cell main body 115.

The cell 100 includes an anode-side separator (not shown), a cathode-side separator (not shown) and a sealing members-integrated MEA (not shown). MEA is the acronym of membrane electrode assembly.

The cell 100 includes an anode gas supply port, an anode off-gas discharge port, six cathode gas supply ports, seven cathode off-gas discharge ports, three cooling water supply ports and three cooling water discharge ports that are provided in the periphery thereof. In the description below, these supply ports and discharge ports are collectively referred to as "supply/discharge ports".

The supply/discharge ports are connected with respective supply/discharge ports provided in the current collector 160F and the front end-side end plate 170F. When the plurality of cells 100 are stacked, these supply-discharge ports are arranged to form manifolds arranged to supply hydrogen as the anode gas, the air as the cathode gas and the cooling water to the respective cells 100 and manifolds arranged to discharge an anode-off gas, a cathode-off gas and the cooling water from the respective cells 100.

Sealing portions (not shown) are formed around the respective supply/discharge ports described above. The presence of these sealing portions ensures the sealing properties of the manifolds between the separators and between the separator and the current collector 160 in the stacked body of the cells 100.

The current collector 160F and the current collector 160E are configured to collect the electric power generated by the respective cells 100 and output the collected electric power via current collecting terminals 161 to outside. The current collector 160F includes supply/discharge ports that are similar to those provided in the cell 100, in the periphery thereof. The insulator plate 165E is a resin plate having the insulation properties. The front end-side end plate 170F and the rear end-side end plate 170E are made of aluminum.

The front side of the case 120 is open as illustrated. The rear side of the case 120 is closed. The fuel cell main body 115 is placed in the case 120. The front end-side end plate 170F is fixed by means of bolts such as to close the front-side opening of the case 120. Such fixation causes the front end-side end plate 170F to be laid on the current collector 160F.

The tension shafts 130 are placed below the fuel cell main body 115. The tension shaft 130 has the front side that is connected with the front end-side end plate 170F and the rear side that is connected with an end face of the case 120. The bottom side of the case 120 is open and is closed by the cover 180 in the state that the fuel cell main body 115 is placed in the case 120.

The hydrogen pump 53 includes a motor portion and a pump portion, although not being illustrated in detail. The motor portion includes a motor and a motor housing. The pump portion includes a rotor provided to compress hydrogen. The rotor is rotated by the torque of the motor. The motor generates a torque, in response to a command from the controller 30.

The hydrogen pump 53 is fixed to the front end-side end plate 170F. In this fixed state, the motor housing of the hydrogen pump 53 is in surface contact with the front end-side end plate 170F. A heat transfer sheet (not shown) is placed between the motor housing and the front end-side end plate 170F. This configuration causes the heat generated in the motor portion to be transferred to the front end-side end plate 170F. As a result, the motor portion has approximately the same temperature as the temperature of the front end-side end plate 170F. As shown in FIG. 2, the front end-side end plate 170F has a larger surface area exposed to outside, compared with the hydrogen pump 53, and is thus likely to release heat. The front end-side end plate 170F accordingly has no significantly elevated temperature. This results in suppressing the motor portion from having an elevated temperature. The rear end-side end plate 170F is also likely to release heat.

Additionally, the front end-side end plate 170F has a large contact area with the current collector 160F and accordingly has approximately the same temperature as the temperature of the current collector 160F. Furthermore, the current collector 160F has a large contact area with a front end cell 100F and accordingly has approximately the same temperature as the temperature of the front end cell 100F. The front end cell 100F denotes one cell 100 that is arranged adjacent to the current collector 160F.

The temperature of the front end-side end plate 170F is thus approximately equal to the temperature of the front end cell 100F. In other words, the temperature of the motor portion is approximately equal to the temperature of the front end cell 100F. The hydrogen pump temperature is accordingly a value reflecting the temperature of the front end cell 100F and is approximately equal to the temperature of the front end cell 100F. The temperature gauge Tp is built in the motor portion and is configured to measure the temperature of the motor core. The controller 30 stops the rotation of the motor in order to protect the motor, when the hydrogen pump temperature becomes equal to or higher than a reference temperature.

Each of the cells 100 is classified in either an end cell group 100*h* or a main cell group 100*s*. As shown in FIG. 2, multiple cells 100 located in the vicinity of the front end and multiple cells 100 located in the vicinity of the rear end belong to the end cell group 100*h*. The front end cell 100F belongs to the end cell group 100*h*. The vicinity of the front end herein means a range on the front end side of a predetermined cell 100 that is away from the front end cell 100F toward the rear end by a predetermined number of cells (for example, 10 cells). Similarly the vicinity of the rear end herein means a range on the rear end side of a predetermined cell 100 that is away from a rear end cell 100 that is located on the rearmost end toward the front end by a predetermined number of cells. The cells 100 placed between the vicinity of the front end and the vicinity of the rear end are the cells located in the middle in the stacking direction and belong to the main cell group 100*s*.

Figure 3:
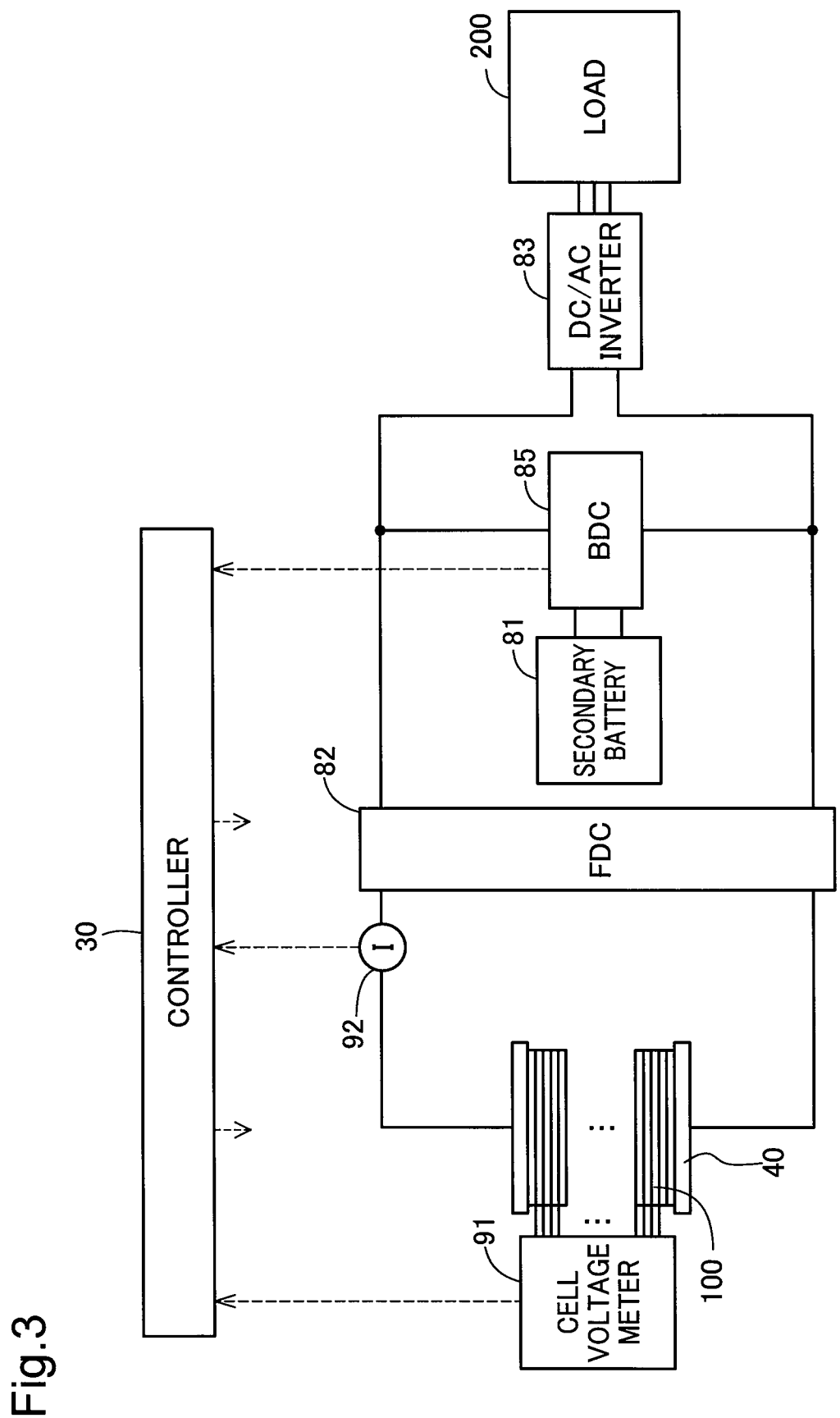
FIG. 3 is a schematic diagram illustrating the electrical configuration of the fuel cell system.

FIG. 3 is a schematic diagram illustrating the electrical configuration of the fuel cell system 20. The fuel cell system 20 includes a secondary battery 81, an FDC 82, a DC/AC inverter 83, a BDC 85, a cell voltage meter 91 and a current measurement unit 92.

The cell voltage meter 91 is connected with each of all the cells 100 included in the fuel cell stack 40 and is configured to measure the cell voltage of each of all the cells 100. According to a modification, the cell voltage meter 91 may be configured to measure an average voltage of each cell group. Each cell group may be comprised of, for example, 2 to 10 cells 100. The cell voltage meter 91 is configured to send the measurement results to the controller 30. The current measurement unit 92 is configured to measure the value of output current from the fuel cell stack 40 and send the measurement result to the controller 30.

The FDC 82 and the BDC 85 are circuits configured as DC/DC converters. The FDC 82 is configured to control the output current from the fuel cell stack 40, in response to a current command value sent from the controller 30. The current command value denotes a target value of output current from the fuel cell stack 40 and is determined by the controller 30.

The FDC 82 serves as an input voltage meter, an output voltage meter and an impedance meter as described below. The FDC 82 is configured to boost an input voltage and supply the boosted voltage to the DC/AC inverter 83. The input voltage herein denotes a total voltage obtained by power generation of the fuel cell stack 40. The voltage after boosting is called output voltage. The output voltage is also called boosted voltage or system voltage. The FDC 82 is configured to measure the values of the input voltage and the output voltage and send the measurement values to the controller 30. The FDC 82 is also configured to measure the impedance of the fuel cell stack 40 by AC impedance method. The frequency of the impedance used in this embodiment includes high frequencies and more specifically includes 100 Hz to 1 kHz.

The BDC 85 is configured to control charging and discharging of the secondary battery 81 under control of the controller 30. The BDC 85 is configured to measure the SOC (state of charge) of the secondary battery 81 and send the measured SOC to the controller 30. The secondary battery 81 is configured by, for example, a lithium ion rechargeable battery and serves as an auxiliary power supply.

The DC/AC inverter 83 is connected with the fuel cell stack 40 and a load 200. The DC/AC inverter 83 is configured to convert a DC power output from the fuel cell stack 40 and the secondary battery 81 into an AC power and supply the AC power to the load 200.

The regenerative power that is generated in the load 200 is converted into a DC current by the DC/AC inverter 83 and is charged into the secondary battery 81 by the BDC 85. The controller 30 calculates an output command value by taking into account the SOC of the secondary battery 81 in addition to the load 200.

Figure 4:
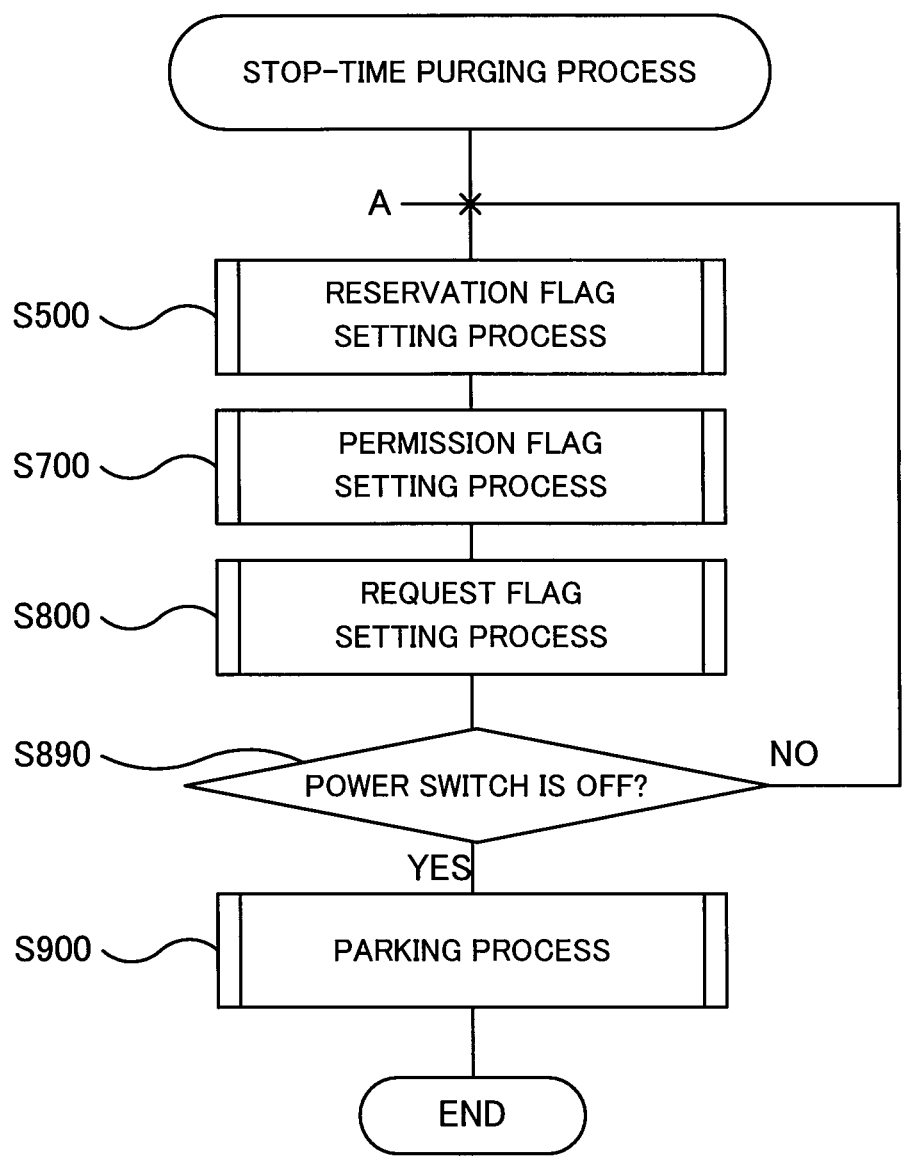
FIG. 4 is a flowchart showing a stop-time purging process.

FIG. 4 is a flowchart showing a stop-time purging process. The stop-time purging process is a process performed to start and suspend stop-time purging. The stop-time purging means purging the cathodes immediately after an OFF operation of a power switch of the motor vehicle 1. The power switch corresponds to an ignition switch of an engine automobile and serves as an input interface to change over between the parking state and the drivable state.

The controller 30 performs the stop-time purging process that is triggered by an ON operation of the power switch. A program configured to perform the stop-time purging process is stored in a built-in storage medium of the controller 30.

As shown in FIG. 4, the controller 30 repeatedly performs a reservation flag setting process (S500), a permission flag setting process (S700) and a request flag setting process (S800) in this sequence as long as the power switch is not turned OFF (S890: NO). When the power switch is turned OFF (S890: YES), the controller 30 performs a parking process (S900) and then terminates the stop-time purging process. When the controller 30 terminates the stop-time purging process, the fuel cell system 20 is stopped.

Figure 5:
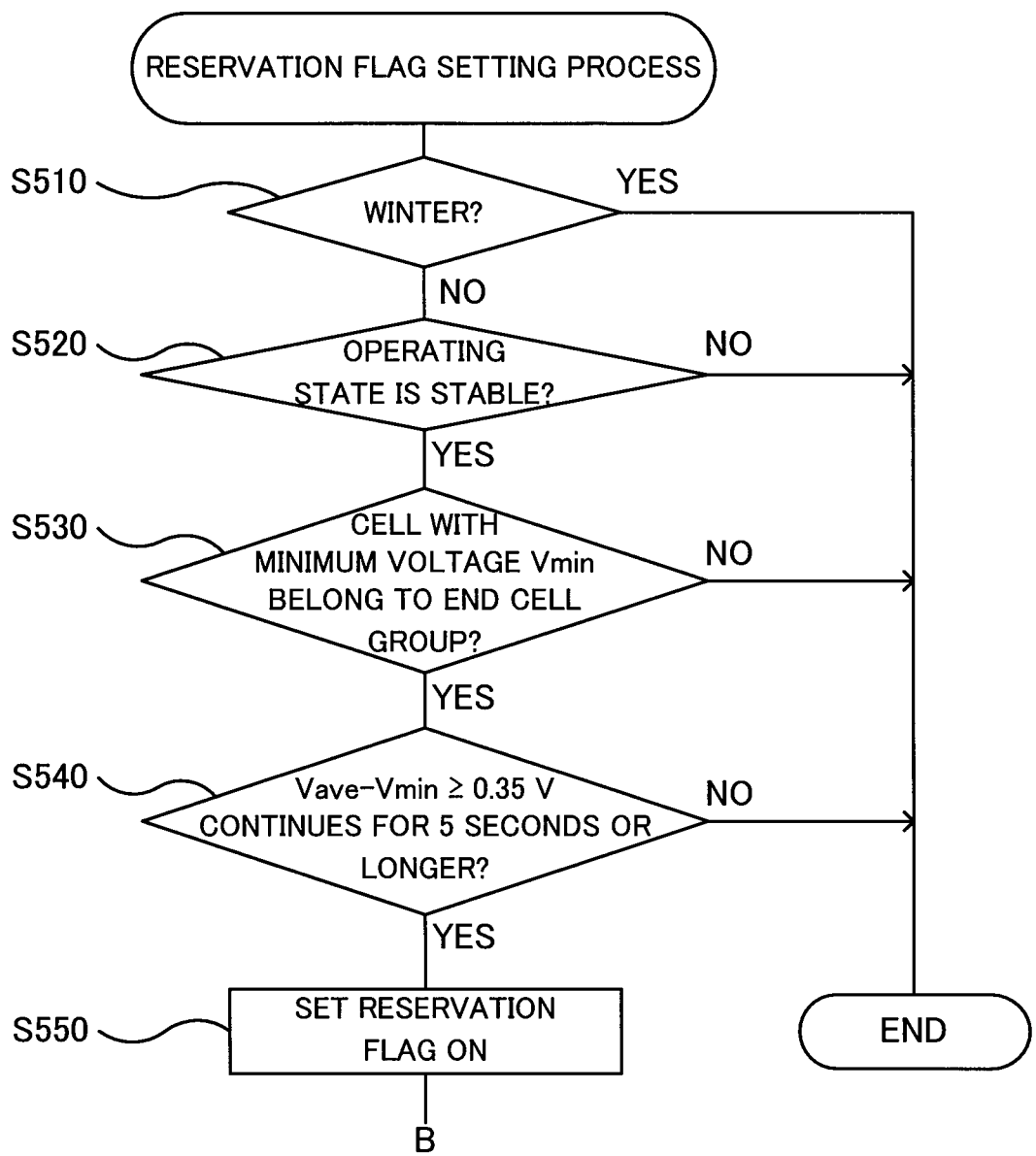
FIG. 5 is a flowchart showing a reservation flag setting process.
Figure 6:
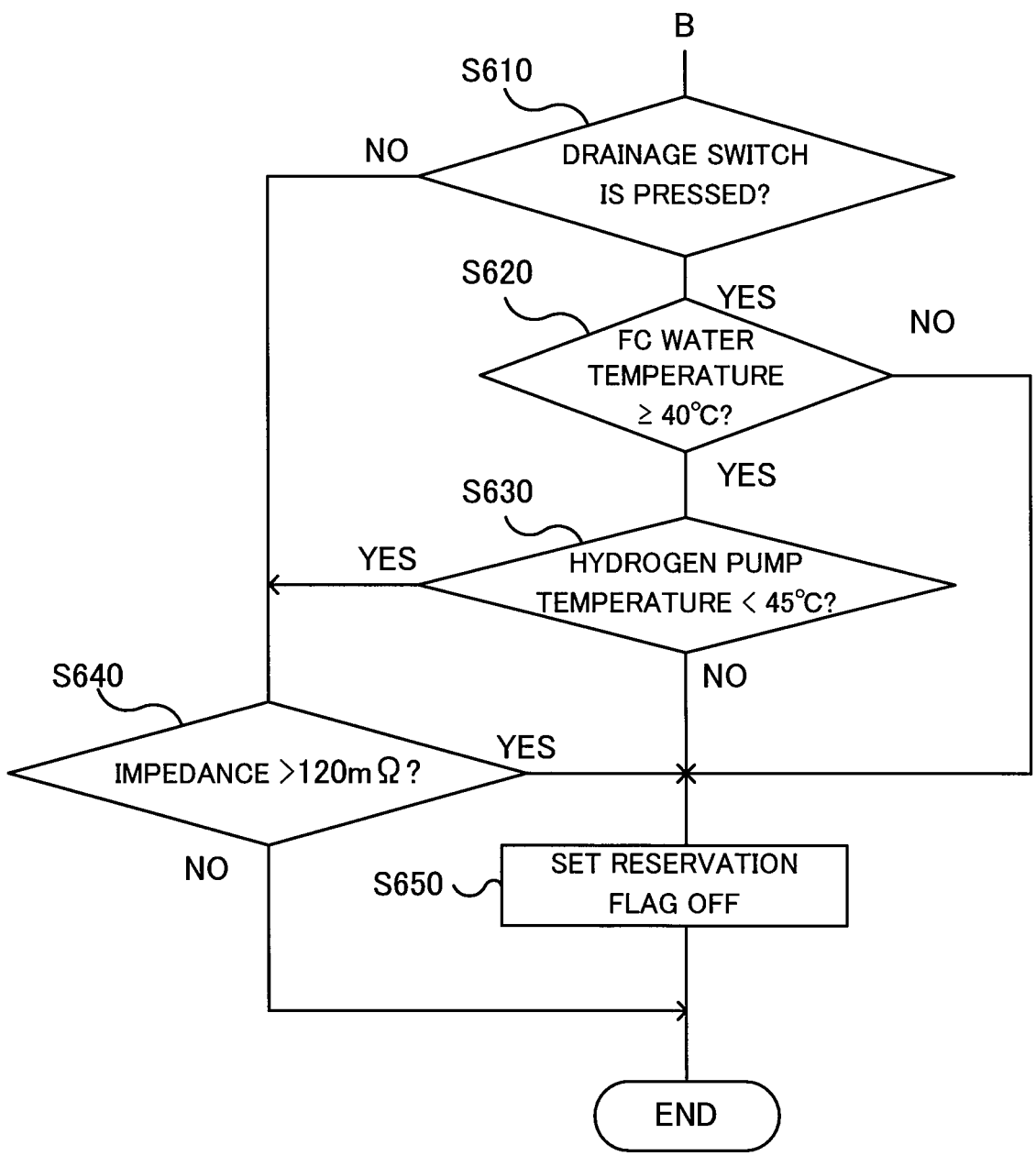
FIG. 6 is a flowchart showing the reservation flag setting process.

FIGS. 5 and 6 are flowcharts showing the reservation flag setting process. The reservation flag setting process is a process performed mainly for the purpose of setting a reservation flag ON when it is desired to perform the stop-time purging. It is desired to perform the stop-time performing, for example, when flooding occurs in the cathodes of the end cell group 100h.

The controller 30 first determines whether it is winter at the moment (S510). More specifically, when the measurement result of the ambient temperature gauge Tatm is lower than a predetermined temperature (for example, 5° C.), it is determined that it is winter at the moment. When the measurement result is not lower than the predetermined temperature, on the other hand, it is determined that it is not winter at the moment. When it is winter at the moment (S510: YES), the controller 30 terminates the reservation flag setting process.

When the reservation flag setting process is terminated without performing the steps of setting the reservation flag ON or OFF as described above, the controller 30 maintains the present value as the value of a reservation flag. The present value is continuously maintained during the stop-time purging process and additionally in the parking state after termination of the stop-time purging process. The maintained value is accordingly used as an initial value of the stop-time purging process that is triggered by a next ON operation of the power switch. The present value is similarly maintained with regard to a permission flag and a request flag described later.

The reservation flag is not changed when it is winter as described above. This is because cathode water (water that is present in the cathode flow paths provided in the respective cells 100) is likely to frozen during parking in the winter. Accordingly a process of more powerfully removing the cathode water than the stop-time purging described according to the embodiment is to be performed in the winter. This process is not explained in detail in the description hereof.

When it is not winter at the moment (S510: NO), the controller 30 subsequently determines whether the operating state of the fuel cell system 20 is stable (S520). S520 to S540 are determination steps performed to set the reservation flag ON (S550) when it is expected that flooding occurs in the end cell group 100h as described below.

S520 is a step performed not to change the reservation flag to ON when a decrease in the cell voltage is attributed to a reason other than flooding. When the operating state of the fuel cell system 20 is not stable (S520: NO), the controller 30 accordingly terminates the reservation flag setting process.

A concrete procedure of determination at S520 determines that the operating state is stable when the state that a predetermined condition is satisfied continues for 4 seconds or longer, and otherwise determines that the operating state is not stable. The predetermined condition is a condition that none of charging of the regenerative power, an intermittent operation, a quick warm-up operation, a start operation and a stop operation is performed.

The intermittent operation denotes temporarily stopping power generation by the fuel cell system 20. The quick warm-up operation denotes operating the fuel cell system 20 at an operation point having a low power generation efficiency, for the purpose of quickly increasing the cell temperature. The start operation denotes an operation performed to start the fuel cell system 20 in response to an ON operation of the power switch. The stop operation denotes an operation performed to stop the operation of the fuel cell system 20 in response to an OFF operation of the power switch. The parking process (S900) is performed as part of the stop operation.

When the operating state of the fuel cell system 20 is stable (S520: YES), the controller 30 determines whether a cell 100 providing a minimum voltage Vmin belongs to the end cell group 100h (S530). The minimum voltage Vmin denotes a minimum value among the measurement values of cell voltage of all the cells 100.

When the cell 100 providing the minimum voltage Vmin belongs to the main cell group 100s (S530: NO), the controller 30 terminates the reservation flag setting process. When the cell 100 providing the minimum voltage Vmin belongs to the end cell group 100h (S530: YES), on the other hand, the controller 30 subsequently determines whether a relation of (average voltage Vave−minimum voltage Vmin) ≥0.35V continues for 5 seconds or longer (S540). The controller 30 obtains the average voltage Vave by dividing the input voltage measured by the FDC 82 by the number of cells 100.

When the duration time of (average voltage Vave−minimum voltage Vmin)≥0.35V is less than 5 seconds (including 0 second) (S540: NO), the controller 30 terminates the reservation flag setting process. When the duration time of (average voltage Vave−minimum voltage Vmin) 0.35V is equal to or greater than 5 seconds (S540: YES), on the other hand, the controller 30 sets the reservation flag ON (S550) and proceeds to B in FIG. 6. Setting the reservation flag ON means changing the reservation flag to ON when the reservation flag is OFF and keeping the reservation flag ON when the reservation flag is ON. The same applies to the case of setting the reservation flag OFF (S660 described later) and also applies to the processes of setting the permission flag and the request flag. The state that (average voltage Vave−minimum voltage Vmin) 0.35V continues for 5 seconds or longer indicates the occurrence of a low voltage state.

S530 and S540 are steps performed to determine whether a decrease in the voltage of the end cell group 100h is attributable to flooding occurring in the end cell group 100h.

On completion of S550, the controller 30 subsequently determines whether a drainage switch is pressed (S610) as shown in FIG. 6. The drainage switch serves as an interface to purge the cathodes at a timing desired by the driver of the motor vehicle 1 and is provided on a dashboard.

When the drainage switch is pressed, the controller 30 purges the cathodes as another process separate from the stop-time purging process shown in FIG. 4. More specifically, the controller 30 feeds the compressed air as a purge gas to the cathodes, such as to discharge cathode water through the air discharge flow path 66 to the atmosphere. The controller 30 continues supplying hydrogen to the anodes during purging of the cathodes. This continues power generation even during purging of the cathodes, in order to avoid a high potential. The same applies to the stop-timing purging.

The controller 30 feeds the compressed air to the cathodes by operating the compressor 62 at the full open positions of the flow dividing valve 63 and the pressure regulator 67.

The following describes the technical significance of purging the cathodes. Repeating the operation of the fuel cell system 20 along with the OFF operation of the power switch in the state that warm-up of the main cell group 100s is completed but warm-up of the end cell group 100h is not completed and repeating the operation of the fuel cell system 20 in the travel history with only the low load result in increasing the amount of cathode water in the end cell group 100h. At least part of the cathode water is transmitted through the MEA and moves into an anode circulation system. The anode circulation system denotes a flow passage that provides circulation by means of the hydrogen pump 53. The water moving into the anode circulation system is likely to be locally accumulated in the anode circulation system especially in the case of a low flow rate or no flow rate at the anodes. For example, the temperature is likely to decrease on the downstream side of the hydrogen pump 53. This increases the possibility that the water vapor is changed to liquid water and that the liquid water is accumulated on the downstream side of the hydrogen pump 53.

When the locally accumulated water abruptly starts flowing, for example, with an increase in the flow rate at the anodes, the water is likely to enter the inlets of the anodes in some cells 100 and thereby interfere with supply of hydrogen to these cells 100. This causes hydrogen deficiency in these cells 100 after consumption of the decreased amount of hydrogen due to the increased amount of water accumulated in the anode circulation system.

Purging the cathodes mainly aims to drain the cathode water in advance, for the purpose of reducing the possibility of hydrogen deficiency. This embodiment accordingly performs both the purging by the operation of the drainage switch and the stop-time purging.

When the FC water temperature is equal to or higher than 40° C. and the hydrogen pump temperature is lower than 45° C., however, both the purging by pressing the drainage switch and the stop-time purging fail to provide the significant effect of drainage of the cathode water. The following describes the reason of such failure.

The FC water temperature is approximately equal to an average value of cell temperature of all the cells 100 (hereinafter referred to as average cell temperature). A large majority of all the cells 100 belong to the main cell group 100s, so that the average cell temperature of all the cells 100 is approximately equal to the average cell temperature of the main cell group 100s. The FC water temperature is accordingly a value reflecting the average cell temperature of the main cell group 100s and is approximately equal to the average cell temperature of the main cell group 100s.

The hydrogen pump temperature is, on the other hand, approximately equal to the cell temperature of the front end cell 100F as described above. Accordingly the state that the FC water temperature is equal to or higher than 40° C. and the hydrogen pump temperature is lower than 45° C. (hereinafter referred to as specific temperature state) indicates the high possibility that the average cell temperature of the main cell group 100s is equal to or higher than 40° C. and the cell temperature of the front end cell 100F is lower than 45° C.

In the specific temperature state, there is a high possibility that the main cell group 100s is dried and that the end cell group 100h has a large amount of cathode water due to dew condensation. In this state, the flow resistance at the cathodes in the end cell group 100h is larger than the flow resistance at the cathodes in the main cell group 100s. As a result, a most part of the compressed air passes through the main cell group 100s. This accelerates drying of the main cell group 100s, while not discharging the cathode water included in the end cell group 100h. The purging in this state thus fails to achieve the expected effect and is additionally likely to cause degradation of the main cell group 100s. The reservation flag setting process accordingly discriminates such purging from the purging that achieves the expected effect by the steps described below.

When the drainage switch is pressed (S610: YES), the controller 30 determines whether the FC water temperature is equal to or higher than 40° C. at the timing of the press of the drainage switch (S620). In order to avoid hunting, a hysteresis is set for the determination of S620 and for the determination of S710 (shown in FIG. 7). More specifically, when the FC water temperature decreases from 40° C. or higher to the present value of 35° C. to 40° C., it is determined that the FC water temperature is equal to or higher than 40° C. until the present value decreases below 35° C.

When the FC water temperature is lower than 40° C. (S620: NO), the controller 30 sets the reservation flag OFF (S650) and terminates the reservation flag setting process. Once the determination result is YES at S610, the determination result is kept NO at step S610 until a next press of the drainage switch.

When the FC water temperature is equal to or higher than 40° C. (S620: YES), on the other hand, the controller 30 subsequently determines whether the hydrogen pump temperature is lower than 45° C. at the timing of the press of the drainage switch (S630). A hysteresis is also set for the determination of S630 and for the determination of S720 (shown in FIG. 7). More specifically, when the hydrogen pump temperature decreases from 45° C. or higher to the present value of 40° C. to 45° C., it is determined that the hydrogen pump temperature is equal to or higher than 45° C. until the present value decreases below 40° C.

S630 practically determines whether "the FC water temperature is equal to or higher than 40° C. and the hydrogen pump temperature is lower than 45° C.". In other words, S630 is a step of determining whether the present state is the specific temperature state.

When the hydrogen pump temperature is equal to or higher than 45° C. (S630: NO), the controller 30 sets the reservation flag OFF (S650). The reservation flag is set OFF in response to the determination result of NO at S620 or at S630. Such setting is because the purging by the operation of the drainage switch is being performed and the stop-time purging is thus not currently needed. The press of the drainage switch is thought to indicate the user's request for avoiding water drainage during parking. Such setting thus also aims to achieve the user's request for minimizing the stop-time purging.

When the FC water temperature is equal to or higher than 40° C. (S620: YES) and the hydrogen pump temperature is lower than 45° C. (S630: YES), on the other hand, the purging fails to achieve the expected effect. In this case, the reservation flag is not set OFF, based on the temperature conditions. The effect achieved by the purging is decreasing the amount of cathode water from the cell that has a large amount of cathode water as described above.

When the hydrogen pump temperature is lower than 45° C. (S630: YES) but the impedance of the fuel cell stack 40 is greater than 120 mΩ (S640: YES), however, the controller 30 sets the reservation flag OFF (S650). When the impedance of the fuel cell stack 40 is greater than 120 mΩ, there is a high possibility that the MEA included in each of the cells 100 is dried. In the dried state of the MEA, it is desired to suspend the stop-time purging. When the impedance of the fuel cell stack 40 is equal to or less than 120 mΩ (S640: NO), on the other hand, the controller 30 keeps the reservation flag ON and terminates the reservation flag setting process.

When the drainage switch is not pressed (S610: NO), the controller 30 also performs the processing of S640 and terminates the reservation flag setting process.

Figure 7:
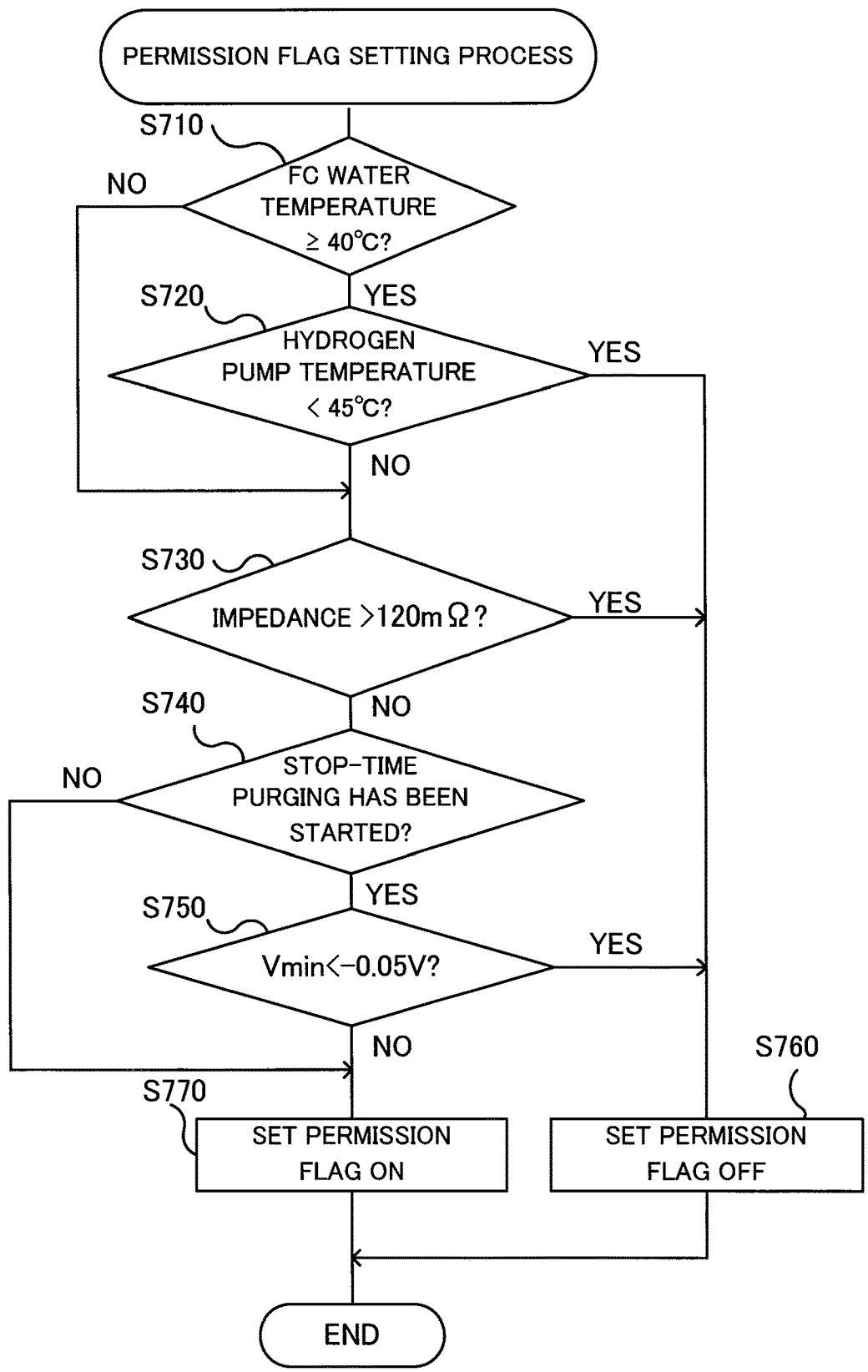
FIG. 7 is a flowchart showing a permission flag setting process.

FIG. 7 is a flowchart showing the permission flag setting process. The permission flag setting process is a process performed mainly for the purpose of setting the permission flag OFF when it is desired to suspend the stop-time purging.

The controller 30 first determines whether the FC water temperature is equal to or higher than 40° C. (S710). When the FC water temperature is equal to or higher than 40° C. (S710: YES), the controller 30 subsequently determines whether the hydrogen pump temperature is lower than 45° C. (S720). When the hydrogen pump temperature is lower than 45° C. (S720: YES), the controller 30 sets the permission flag OFF (S760). In other words, the permission flag is set OFF when the present state is the specific temperature state. The permission flag is set OFF because it is desired to suspend the stop-time purging as described above with regard to the reservation flag setting process.

When the FC water temperature is lower than 40° C. (S710: NO) or when the hydrogen pump temperature is equal to or higher than 45° C. (S720: NO), on the other hand, the controller 30 does not immediately proceed to S760 but proceeds to S730. The details of the processing of S710 and S720 are described below.

Figure 8:
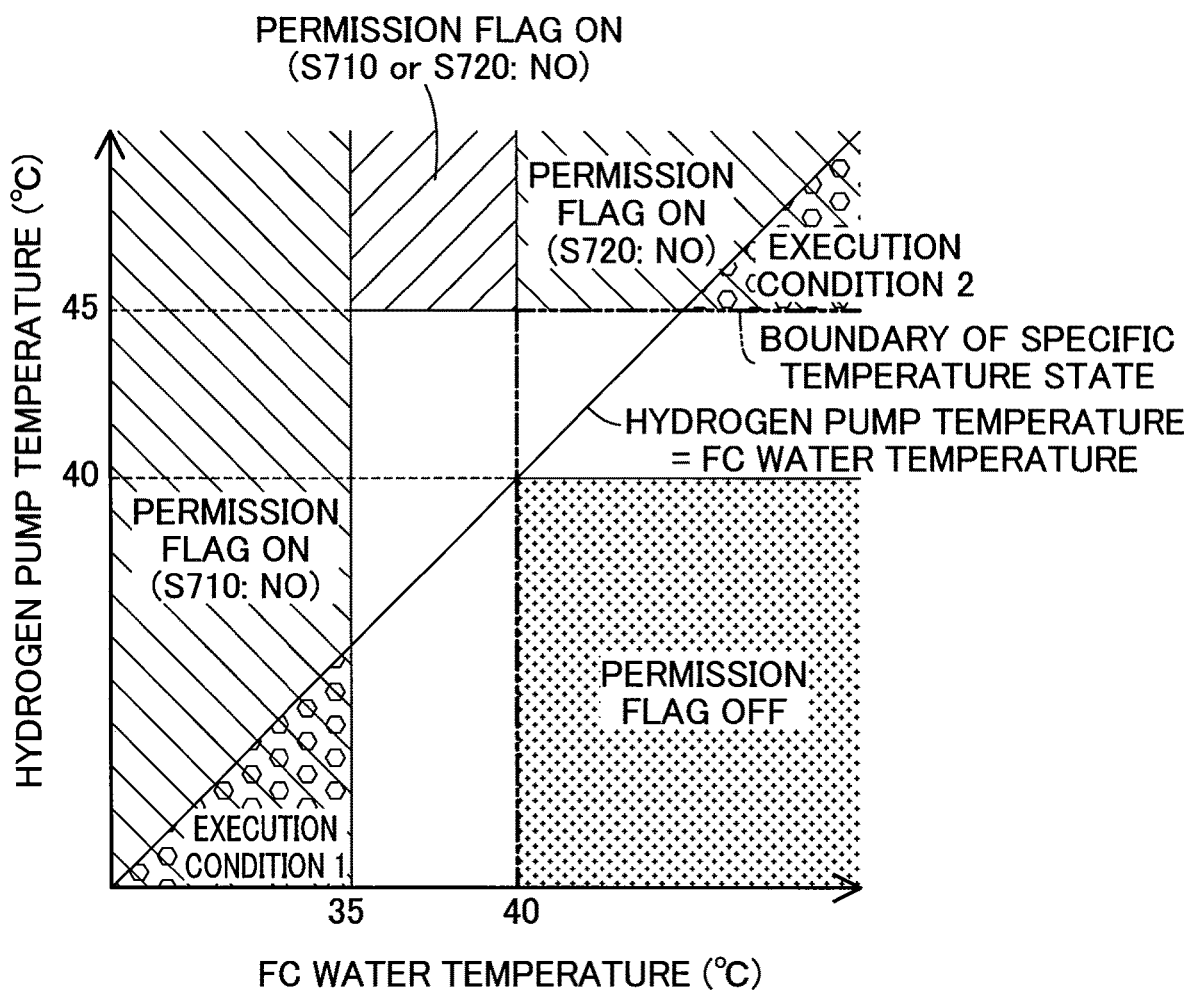
FIG. 8 is a graph showing a relationship of the setting of a permission flag to hydrogen water temperature and FC water temperature.

FIG. 8 is a graph showing whether the permission flag is to be set ON or to be set OFF according to the hydrogen pump temperature and the FC water temperature. In other words, FIG. 8 shows the results of setting on the assumption that the permission flag is set by only the processing of S710 and S720 in the permission flag setting process.

In a region with the permission flag to be set OFF shown in FIG. 8, the permission flag is set OFF even when the steps described below are performed in the permission flag setting process. In regions with the permission flag to be set ON shown in FIG. 8, on the other hand, the permission flag may be set OFF by performing the steps described below in the permission flag setting process. In remaining regions without the permission flag to be set ON or OFF shown in FIG. 8, the setting of the permission flag is determined according to the hysteresis.

As shown in FIG. 8, when the conditions of the FC water temperature 40° C. and the hydrogen pump temperature<40° C. are satisfied, the permission flag is to be set OFF. With regard to the FC water temperature, 40° C. is set as a first reference temperature. With regard to the hydrogen pump temperature, 40° C. is set as a second reference temperature. These temperature conditions are conditions included in the specific temperature state described above.

According to this embodiment, the conditions of the FC water temperature first reference temperature and the hydrogen pump temperature<second reference temperature are not the necessary conditions but are the sufficient conditions to set the permission flag OFF and thereby suspend the stop-time purging.

When at least one of the conditions of the FC water temperature<35° C. and the hydrogen pump temperature 45° C. is satisfied, on the other hand, the permission flag is to be set ON. In the actual operation, however, the hydrogen pump temperature is less likely to be higher than the FC water temperature. This is because the temperature of the end cell group 100h is likely to be lower than the temperature of the main cell group 100s by heat release from the front end-side end plate 170F and the rear end-side end plate 170E as described above but is less likely to be higher than the temperature of the main cell group 100s. The actual temperature conditions are thus mostly included in a lower right region in the graph relative to a straight line showing that the hydrogen pump temperature is equal to the FC water temperature.

The temperature condition that the permission flag is actually set ON is accordingly given either as a region that is expressed as execution condition 1 or as a region that is expressed as execution condition 2. The region of execution condition 1 is a region where the condition of 35° C.>FC water temperature hydrogen pump temperature is satisfied. The region of execution condition 2 is a region where the condition of FC water temperature hydrogen pump temperature 45° C. is satisfied.

A small difference between the amount of cathode water in the main cell group 100s and the amount of cathode water in the end cell group 100h is common to the region of execution condition 1 and the region of execution condition 2. As a result, a small difference between the flow resistance in the main cell group 100s and the flow resistance in the end cell group 100h is common to the region of execution condition 1 and the region of execution condition 2.

There is, however, a significant difference in the amount of cathode water in the entire stacked body 110 between the region of execution condition 1 and the region of execution condition 2. In the region of execution condition 1, both the FC water temperature and the hydrogen pump temperature are low. Accordingly both the main cell group 100s and the end cell group 100h have large amounts of cathode water. It is desired to perform the stop-time purging especially in this state. The ambient temperature that is likely to provide the region of execution condition 1 is not higher than 20° C. and is more specifically not higher than 15° C. When the ambient temperature is lower than 5° C., however, it is determined that it is winter at the moment (S510: YES) as described above. In this case, a different process from the stop-time purging is performed according to this embodiment.

In the region of execution condition 2, both the FC water temperature and the hydrogen pump temperature are high. Accordingly both the main cell group 100s and the end cell group 100h have small amounts of cathode water. In this state, performing the stop-time purging have little adverse effects. There is accordingly no need to suspend the stop-time purging. In the region of execution condition 2, although the cells 100 have a small amount of cathode water as a whole, the flow path in some of the cells 100 may be locally clogged by the cathode water. The stop-time purging is effective to eliminate such clogging by the cathode water. Such clogging by the cathode water is likely to occur in the end cell group 100h that tends to have the lower temperature.

The description goes back to the permission flag setting process. The controller 30 determines whether the impedance of the fuel cell stack 40 is greater than 120 mΩ at S730. When the impedance is greater than 120 mΩ (S730: YES), there is a high possibility that the MEA is dried. The controller 30 accordingly sets the permission flag OFF (S760).

When the impedance is equal to or less than 120 mΩ (S730: NO), on the other hand, the controller 30 subsequently determines whether the stop-time purging has already been started (S740). When the stop-time purging has not yet been started (S740: NO), the controller 30 sets the permission flag ON (S770) and terminates the permission flag setting process.

When the stop-time purging has already been started (S740: YES), the controller 30 subsequently determines whether the minimum voltage Vmin is lower than −0.05V (S750). When the minimum voltage Vmin is lower than −0.05V (S750: YES), the controller 30 sets the permission flag OFF (S760) and terminates the permission flag setting process.

The permission flag is set OFF because the minimum voltage Vmin is likely to decrease during the stop-time purging. Such a decrease in the minimum voltage Vmin may be attributed to the fact that the flow path in the cell 100 is newly clogged by the water that is produced in the cell 100 during power generation performed for the purpose of avoiding a high potential. It is accordingly desired to suspend the stop-time purging when a negative voltage is generated. The negative voltage is likely to damage the cell 100.

When the minimum voltage Vmin is equal to or higher than −0.05V (S750: NO), on the other hand, the controller 30 sets the permission flag ON (S770) and terminates the permission flag setting process.

Figure 9:
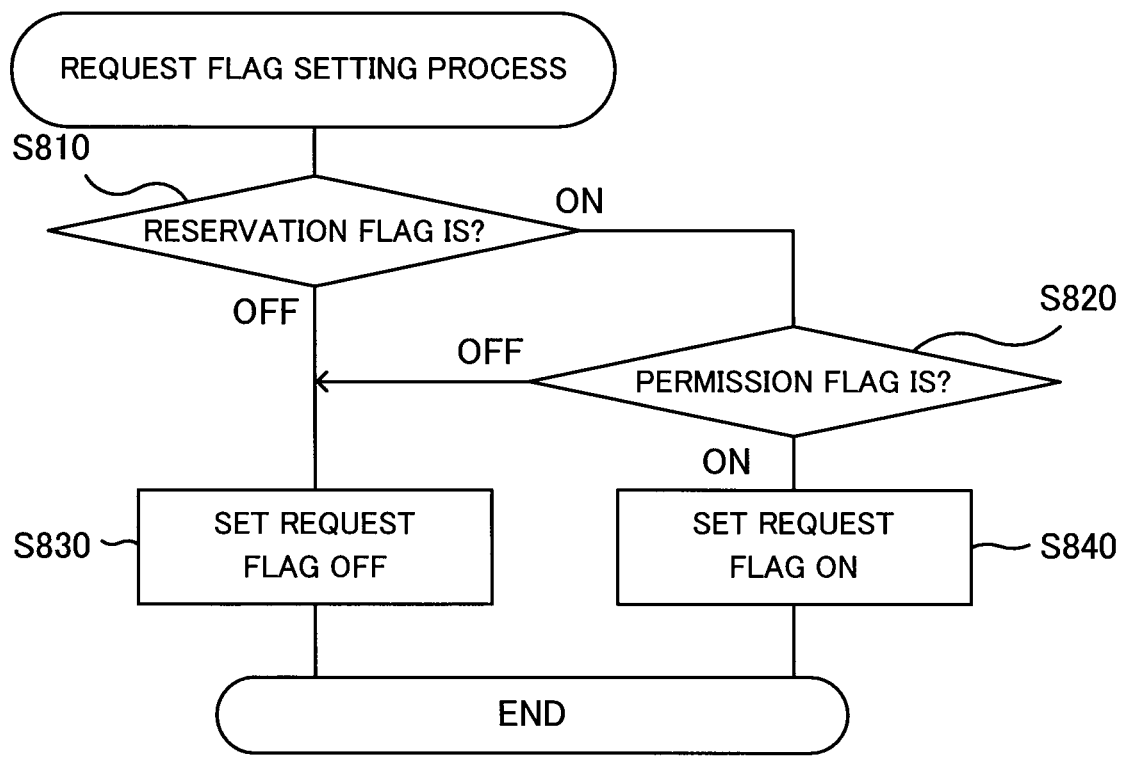
FIG. 9 is a flowchart showing a request flag setting process.

FIG. 9 is a flowchart showing the request flag setting process. The controller 30 first identifies the setting of the reservation flag (S810). When the reservation flag is OFF (S810: OFF), the controller 30 sets the request flag OFF (S830) and terminates the request flag setting process. When the reservation flag is ON (S810: ON), on the other hand, the controller 30 subsequently identifies the setting of the permission flag (S820). When the permission flag is OFF (S820: OFF), the controller 30 sets the request flag OFF (S830) and terminates the request flag setting process. When the permission flag is ON (S820: ON), on the other hand, the controller 30 sets the request flag ON (S840) and terminates the request flag setting process.

Figure 10:
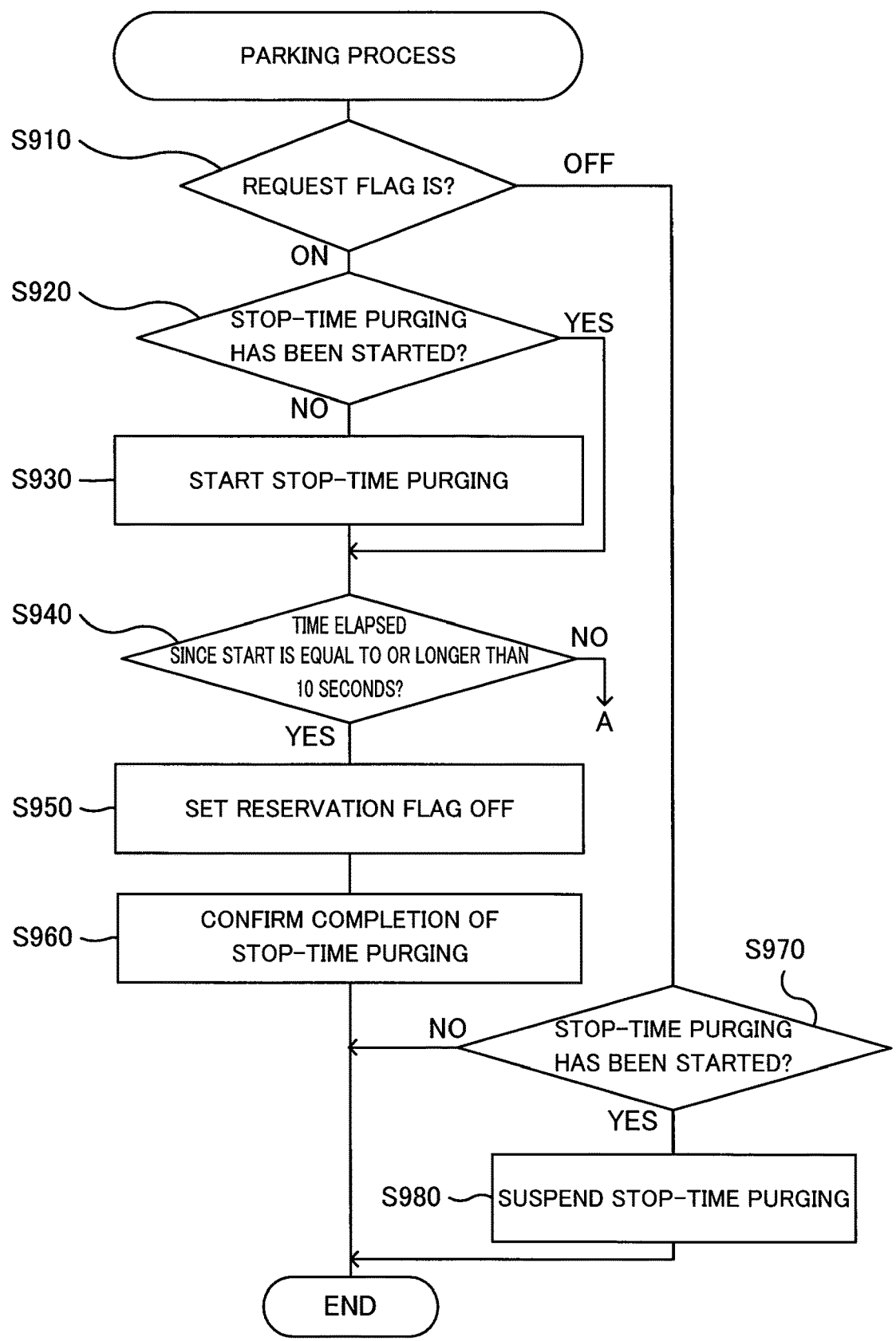
FIG. 10 is a flowchart showing a parking process.

FIG. 10 is a flowchart showing the parking process. The parking process is triggered by an OFF operation of the power switch (S890: YES) as described above. Once the power switch is turned OFF, the determination step of S890 continuously provides the determination result of YES until the power switch is subsequently turned ON. The stop-time purging process is repeatedly performed at short time intervals (for example, 10 to 20 milliseconds). Accordingly the setting of the request flag in a first cycle of the parking process is thought to reflect the state at the time of the OFF operation of the power switch.

The controller 30 first identifies the setting of the request flag (S910). When the request flag is ON (S910: ON), the controller 30 subsequently determines whether stop-time purging has already been started (S920). When the stop-time purging has not yet been started (S920: NO), the controller 30 starts the stop-time purging (S930). The stop-time purging is performed by the similar procedure to the procedure of purging by pressing the drainage switch. When the stop-time purging has already been started (S920: YES), on the other hand, the controller 30 skips the processing of S930.

The controller 30 subsequently determines whether a time elapsed since the start of the stop-time purging is equal to or longer than 10 seconds (S940). When the elapsed time is less than 10 seconds (S940: NO), the controller 30 goes back to the reservation flag setting process as shown by A in FIG. 10 and FIG. 4. The condition that the time elapsed since the start of the stop-time purging is equal to or longer than 10 seconds is the original condition to complete the stop-time purging. More specifically, when the time elapsed since the start of the stop-time purging is equal to or longer than 10 seconds, it is expected that water drainage is sufficiently achieved by the stop-time purging.

When the elapsed time is equal to or longer than 10 seconds (S940: YES), the controller 30 sets the reservation flag OFF (S950), confirms completion of the stop-time purging (S960) and terminates the parking process. Terminating the parking process results in terminating the stop-time purging process. The reservation flag is set OFF at step S960, because of the following reason. Once the stop-time purging is completed, performing another stop-time purging does not achieve effective water drainage until the determination result of YES is provided again at S540 after a next ON operation of the power switch.

When the request flag is OFF (S910: OFF), on the other hand, the controller 30 determines whether the stop-time purging has already been started (S970). When the stop-time purging has not yet been started (S970: NO), the controller 30 terminates the parking process and thereby suspends the stop-time purging. Suspending the stop-time purging in this state means that the stop-time purging is not started. The stop-time purging is suspended in this way when the power switch is turned OFF in the state that the request flag is OFF. The state that the request flag is OFF means that at least one of the permission flag and the request flag is OFF.

When the stop-time purging has already been started (S970: YES), on the other hand, the controller 30 suspends the stop-time purging (S980) and then terminates the parking process. Suspending the stop-time purging in this state means that the stop time purging that has been started is stopped prior to completion. The stop-time purging is suspended in this way when the permission flag is changed to OFF after the stop-time purging has been started, i.e., when the present state is changed to the state where it is desired not to perform the stop-time purging after the stop-time purging has been started.

The reservation flag is set OFF when the determination result of YES is provided at S640 after a start of the parking process. In this case, however, the permission flag is also set OFF (S730: YES, S760). Accordingly there is no case to perform S980 when the reservation flag is changed to OFF while the permission flag is kept ON.

In the case where the parking process is terminated through the processing of S970, when the reservation flag is ON, the controller 30 keeps the reservation fag ON. The initial value of the reservation flag is accordingly ON in a subsequent cycle of the stop-time purging process.

In many cases, the FC water temperature is lower than 40° C. at the time of an ON operation of the power switch, so that the permission flag is set ON immediately after the start of the stop-time purging process. Accordingly the stop-time purging is performed in response to an OFF operation of the power switch before the FC water temperature reaches 40° C. This shall, however, not apply when the impedance is equal to or less than 120 mΩ.

As described above, the procedure of this embodiment appropriately suspends the stop-time purging.

The following describes a modification.

Figure 11:
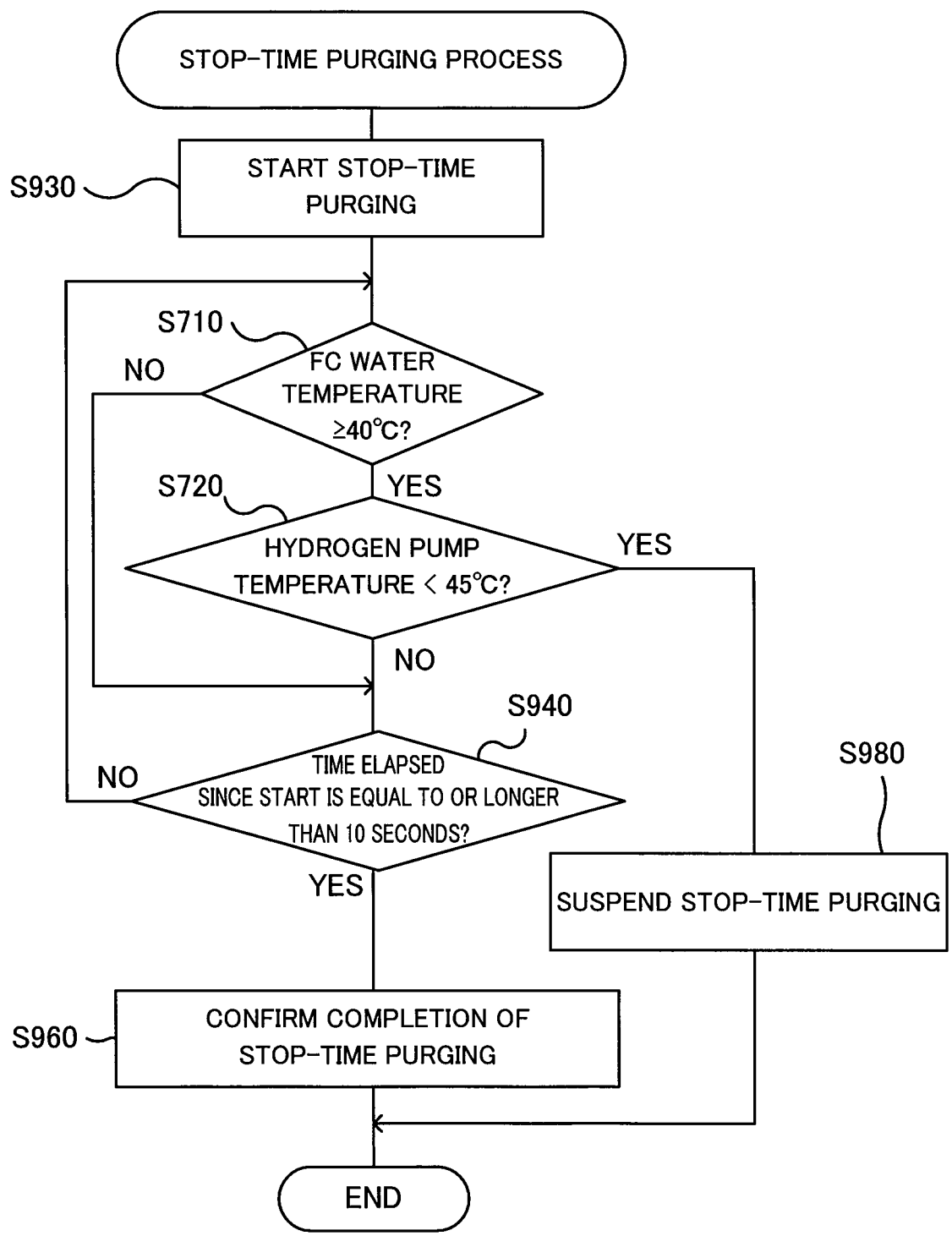
FIG. 11 is a flowchart showing a stop-time purging process according to a modification.

FIG. 11 is a flowchart showing a stop-time purging process according to a modification (hereinafter referred to as modified process). The modified process is triggered by an OFF operation of the power switch. The like steps in the modified process to the steps in the stop-time purging process of the embodiment are shown by the like step numbers. In the modified process, stop-time purging is started (S930) irrespective of the values of the FC water temperature and the hydrogen pump temperature. The stop-time purging is, however, suspended (S980) when the cathode water is locally accumulated (S720: YES) after the start of the stop-time purging. Other modifications are described below.

According to another modification, once the stop-time purging is started, the stop-time purging may not be suspended, unlike the embodiment and the modification described above.

A dedicated temperature gauge may be provided to measure the temperature of the main cell group. For example, a temperature gauge may be placed in one certain cell belonging to the main cell group.

A dedicated temperature gauge may be provided to measure the temperature of the end cell group. For example, a temperature gauge may be placed in one certain cell belonging to the end cell group. In another example, a temperature gauge may be provided to measure the temperature of a front end-side current collector, a rear end-side current collector, a front end-side end plate or a rear end-side end plate.

The reservation flag or the permission flag may not be necessarily set OFF, based on the impedance.

The stop-time purging may not be necessarily suspended in the case of generation of a negative voltage.

According to another modification, when the stop-time purging is suspended in response to the setting of the permission flag to OFF, the setting of the reservation flag may be changed from ON to OFF along with suspension of the stop-time purging.

According to another modification, the reservation flag setting process may not necessarily perform the determination of whether the cell providing the minimum voltage Vmin belongs to the end cell group (S530). In other words, the determination step of S540 may be performed even when the cell providing the minimum voltage Vmin belongs to the main cell group. The reservation flag may be set ON by performing the determination step of S540.

The reservation flag may not be necessarily used to determine whether the stop-time purging is to be performed.

The boundary between the main cell group and the end cell group may be changed appropriately.

The second reference temperature may be lower than or may be higher than the first reference temperature.

The hysteresis may not be necessarily provided in the process of setting the permission flag based on the first reference temperature.

The hysteresis may not be necessarily provided in the process of setting the permission flag based on the second reference temperature.

The cell voltage meter may not be necessarily configured to measure the cell voltages of all the cells.

The motor vehicle 1 may be a connected car. The connected car is an automobile that is provided with communication equipment to receive services by cloud communications. In this case, the determination of whether it is winter (S510) may be performed, based on information obtained by communication.

According to one aspect of the disclosure, there may be provided a fuel cell system. This fuel cell system may comprise a fuel cell stack including a stacked body provided by stacking a plurality of cells in a stacking direction; a compressor configured to feed a purge gas to a cathode of the fuel cell stack; a controller configured to control the compressor, such as to perform stop-time purging that purges the cathode of the fuel cell stack when operation of the fuel cell stack is stopped; a first temperature gauge configured to measure a first temperature value that reflects temperature of a cell placed near a center in the stacking direction among the plurality of cells constituting the stacked body and to input the measured first temperature value into the controller; and a second temperature gauge configured to measure a second temperature value that reflects temperature of a cell placed near an end in the stacking direction among the plurality of cells constituting the stacked body and to input the measured second temperature value into the controller. The controller may be configured to suspend the stop-time purging when the first temperature value is equal to or higher than a first reference temperature and the second temperature value is lower than a second reference temperature.

When the first temperature value is equal to or higher than the first reference temperature, the cell placed near the center is more likely to have a small amount of cathode water. When the second temperature value is lower than the second reference temperature, on the other hand, the cell placed near the end is more likely to have a large amount of cathode water. Performing the stop-time purging in such a state that water is locally accumulated is likely to cause the problem described above. The fuel cell system of this aspect uses the measurement results of the first temperature value and the second temperature value to suspend the stop-time purging that is likely to cause the problem described above. Suspending the stop-time purging includes a procedure of not starting the stop-time purging and a procedure of stopping in the middle of the stop-time purging. Stopping in the middle of the stop-time purging means that the stop-time purging that has been started is stopped before the original condition to complete the stop-time purging is satisfied.

In the fuel cell system of the above aspect, the first temperature gauge may be configured to measure temperature of cooling water that is discharged from the fuel cell stack. In the fuel cell system of this aspect, the first temperature gauge is not exclusively provided only for the purpose of measuring the first temperature value.

In the fuel cell system of the above aspect, the fuel cell stack may be configured to include an end plate that is placed at an end in the stacking direction and that has a supply port and a discharge port of an anode gas. The fuel cell system of this aspect may further comprise a hydrogen pump mounted to the end plate and configured to supply a gas that is discharged from the discharge port, to the supply port. The second temperature gauge may be configured to measure temperature of the hydrogen pump. In the fuel cell system of this aspect, the second temperature gauge is not exclusively provided only for the purpose of measuring the second temperature value.

The fuel cell system of the above aspect may further comprise an impedance meter configured to measure an impedance of the stacked body and to input the measured impedance into the controller. The controller may be configured to suspend the stop-time purging when at least one of conditions that the first temperature value is lower than the first reference temperature and that the second temperature value is equal to or higher than the second reference temperature is satisfied and the measured impedance is greater than a predetermined value. This configuration suppresses the cell from being excessively dried by purging.

The fuel cell system of the above aspect may further comprise a cell voltage meter configured to measure cell voltages of measurement subject cells that are at least part of the plurality of cells and to input the measured cell voltages into the controller. The controller may be configured to suspend the stop-time purging when a negative voltage is generated in at least one of the measurement subject cells for a time duration from start to completion of the stop-time purging. This configuration suppresses the cell voltage from further decreasing below the negative pressure by purging.

The fuel cell system of the above aspect may further comprise a cell voltage meter configured to measure cell voltages of measurement subject cells that are at least part of the plurality of cells and to input the measured cell voltages into the controller; and an input voltage meter configured to measure an input voltage generated by power generation of the fuel cell stack. The controller may be configured to suspend the stop-time purging on non-occurrence of a low voltage state where a condition that a difference obtained by subtracting a minimum value among the cell voltages of the measurement subject cells from an average voltage determined according to the input voltage measured by the input voltage meter is greater than a predetermined voltage difference, continues for a predetermined time period or longer. The non-occurrence of the low voltage state indicates the high possibility of a small amount of cathode water. Purging is not required in the case of a small amount of cathode water. This configuration accordingly avoids non-required purging.

In the fuel cell system of the above aspect, when the stop-time purging is suspended on occurrence of the low voltage state, the controller may be configured to perform the stop-time purging at a time of stopping a next operation of the fuel cell system even if the low voltage state does not occur during the next operation of the fuel cell stack. On the occurrence of the low voltage state, it is desired to perform purging. When the stop-time purging is suspended in the state that it is desired to perform purging, this configuration increases the possibility that purging is performed at the time of stopping the next operation of the fuel cell stack.

In the fuel cell system of the above aspect, the minimum value used for calculation of the difference may be a voltage of the cell placed near the end. When the cell placed near the end has a large amount of cathode water, this configuration enables the stop-time purging to be performed at the time of stopping the next operation of the fuel cell stack.

In the fuel cell system of the above aspect, the second reference temperature may be a value that is equal to or higher than the first reference temperature. This configuration more effectively avoids the occurrence of the problem described above.

The present disclosure may be implemented by various aspects other than the aspects of the fuel cell system described above, for example, a purge method, a program configured to implement this method, and a non-transitory storage medium in which this program is stored.

What is claimed is:

1. A fuel cell system, comprising:
    a fuel cell stack including a stacked body provided by stacking a plurality of cells in a stacking direction;
    a compressor configured to feed a purge gas to a cathode of the fuel cell stack;
    a controller that controls the compressor to perform stop-time purging that purges the cathode of the fuel cell stack when operation of the fuel cell system is stopped;
    a first temperature gauge configured to measure a first temperature value that reflects temperature of a cell placed near a center in the stacking direction among the plurality of cells constituting the stacked body and to input the measured first temperature value into the controller; and
    a second temperature gauge configured to measure a second temperature value that reflects temperature of a cell placed near an end in the stacking direction among the plurality of cells constituting the stacked body and to input the measured second temperature value into the controller, wherein
    the controller suspends the compressor from performing the stop-time purging when the first temperature value is equal to or higher than a first reference temperature and the second temperature value is lower than a second reference temperature.

2. The fuel cell system according to claim 1, wherein the first temperature gauge is configured to measure temperature of cooling water that is discharged from the fuel cell stack.

3. The fuel cell system according to claim 1, wherein the fuel cell stack is configured to include an end plate that is placed at an end in the stacking direction and that has a supply port and a discharge port of an anode gas,
    the fuel cell system further comprising:
    a hydrogen pump mounted to the end plate and configured to supply a gas that is discharged from the discharge port, to the supply port, wherein
    the second temperature gauge is configured to measure temperature of the hydrogen pump.

4. The fuel cell system according to claim 1, further comprising:
    an impedance meter configured to measure an impedance of the stacked body and to input the measured impedance into the controller, wherein
    the controller is configured to suspend the stop-time purging when the measured impedance is greater than a predetermined value and either the first temperature value is lower than the first reference temperature or the second temperature value is equal to or higher than the second reference temperature.

5. The fuel cell system according to claim 1, further comprising:
a cell voltage meter configured to measure cell voltages of measurement subject cells that are at least part of the plurality of cells and to input the measured cell voltages into the controller, wherein
the controller is configured to suspend the stop-time purging when a negative voltage is generated in at least one of the measurement subject cells for a time duration from start to completion of the stop-time purging.

6. The fuel cell system according to claim 1, further comprising:
a cell voltage meter configured to measure cell voltages of measurement subject cells that are at least part of the plurality of cells and to input the measured cell voltages into the controller; and
an input voltage meter configured to measure an input voltage generated by power generation of the fuel cell stack, wherein
the controller is configured to suspend the stop-time purging on non-occurrence of a low voltage state where a condition that a difference obtained by subtracting a minimum value among the cell voltages of the measurement subject cells from an average voltage determined according to the input voltage measured by the input voltage meter is greater than a predetermined voltage difference, continues for a predetermined time period or longer.

7. The fuel cell system according to claim 6,
wherein when the stop-time purging is suspended on occurrence of the low voltage state, the controller is configured to perform the stop-time purging at a time of stopping a next operation of the fuel cell system even if the low voltage state does not occur during the next operation of the fuel cell stack.

8. The fuel cell system according to claim 6,
wherein the minimum value used for calculation of the difference is a voltage of the cell placed near the end.

9. The fuel cell system according to claim 1,
wherein the second reference temperature is a value that is equal to or higher than the first reference temperature.

10. The fuel cell system of claim 1, wherein the controller acquires the first temperature value from the first temperature gauge and the second temperature value from the second temperature gauge, compares the first temperature value with a first reference temperature and the second temperature value with a second reference temperature, and determines suspension of the compressor from performing the stop-time purging when the first temperature value is equal to or higher than the first reference temperature and the second temperature value is lower than the second reference temperature, and controls the compressor to suspend the compressor from performing the stop-time purging.

* * * * *